(12) United States Patent  
Wang et al.

(10) Patent No.: US 8,356,514 B2
(45) Date of Patent: Jan. 22, 2013

(54) SENSOR WITH IMPROVED THERMAL STABILITY

(75) Inventors: Yong-Fa Wang, Coppell, TX (US); Scott Edward Beck, Murphy, TX (US)

(73) Assignee: Honeywell International Inc., Morristown, NJ (US)

( * ) Notice: Subject to any disclaimer, the term of this patent is extended or adjusted under 35 U.S.C. 154(b) by 29 days.

(21) Appl. No.: 13/006,397

(22) Filed: Jan. 13, 2011

(65) Prior Publication Data

US 2012/0180563 A1    Jul. 19, 2012

(51) Int. Cl.
*G01F 1/68* (2006.01)
(52) U.S. Cl. .................................................. 73/204.26
(58) Field of Classification Search ....... 73/73.24–73.26
See application file for complete search history.

(56) References Cited

U.S. PATENT DOCUMENTS

| | | |
|---|---|---|
| 4,391,846 A | 7/1983 | Raymond |
| 4,478,076 A | 10/1984 | Bohrer |
| 4,478,077 A | 10/1984 | Bohrer et al. |
| 4,501,144 A | 2/1985 | Higashi et al. |
| 4,548,078 A | 10/1985 | Bohrer et al. |
| 4,651,564 A | 3/1987 | Johnson et al. |
| 4,685,331 A | 8/1987 | Renken et al. |
| 4,739,657 A | 4/1988 | Higashi et al. |
| 4,829,818 A | 5/1989 | Bohrer |
| 4,952,904 A | 8/1990 | Johnson et al. |
| 5,027,499 A | 7/1991 | Prohaska |
| 5,165,292 A | 11/1992 | Proshaka |
| 5,244,179 A | 9/1993 | Wilson |
| 5,385,046 A | 1/1995 | Yamakawa et al. |
| 5,404,753 A | 4/1995 | Hecht et al. |
| 5,601,693 A | 2/1997 | Davies |
| 5,635,893 A | 6/1997 | Spraggins et al. |
| 5,741,968 A | 4/1998 | Arai |
| 5,965,813 A | 10/1999 | Wan et al. |

(Continued)

FOREIGN PATENT DOCUMENTS

| | | |
|---|---|---|
| EP | 0669521 | 8/1995 |
| EP | 1182432 | 2/2002 |

(Continued)

OTHER PUBLICATIONS

Zhoa et al., "A Thermal Stack Structure for Measurement of Fluid Flow", School of Electrical & Electronic Engineering, Queen's University Belfast, Belfast BT9 5AH, UK, SPIE vol. 4876, p. 593-604, 2003.

(Continued)

*Primary Examiner* — Jewel V Thompson
(74) *Attorney, Agent, or Firm* — Seager Tufte & Wickhem LLC

(57) ABSTRACT

Improved sensors are disclosed that include a heater resistor and/or one or more sensor resistors. In some instances, the heater resistor may be configured to have a zero or near-zero temperature coefficient of resistance (TCR), while one or more sensor resistors may be configured to have a non-zero higher TCR. In some instances, the heater resistor may include a polysilicon material that is doped with a first concentration of dopant, and the one or more sensing elements may include a polysilicon material that is doped with a second higher concentration of dopant. In some cases, the first concentration of dopant may be configured to provide a heater resistor that has a zero or near-zero temperature coefficient of resistance (TCR).

14 Claims, 9 Drawing Sheets

U.S. PATENT DOCUMENTS

| | | | |
|---|---|---|---|
| 5,996,419 A | 12/1999 | Sokn | |
| 6,124,632 A | 9/2000 | Lo et al. | |
| 6,140,906 A | 10/2000 | Kaihara et al. | |
| 6,357,294 B1 * | 3/2002 | Nakada | 73/204.26 |
| 6,591,674 B2 | 7/2003 | Gehman et al. | |
| 6,647,778 B2 | 11/2003 | Sparks | |
| 6,705,160 B2 | 3/2004 | Iwaki et al. | |
| 6,729,181 B2 | 5/2004 | Mayer et al. | |
| 6,923,053 B2 | 8/2005 | Yamada et al. | |
| 7,059,186 B2 | 6/2006 | Pinter et al. | |
| 7,082,825 B2 | 8/2006 | Aoshima et al. | |
| 7,219,551 B2 | 5/2007 | Suzuki | |
| 7,228,614 B2 | 6/2007 | Yamada et al. | |
| 7,258,003 B2 | 8/2007 | Padmanabhan | |
| 7,278,309 B2 | 10/2007 | Dmytriw et al. | |
| 7,409,853 B2 * | 8/2008 | Biberger et al. | 73/61.51 |
| 7,409,859 B2 | 8/2008 | Watanabe et al. | |
| 7,436,037 B2 | 10/2008 | Kurtz et al. | |
| 7,513,149 B1 | 4/2009 | Ricks | |
| 7,610,803 B2 | 11/2009 | Ricks | |
| 7,647,842 B1 | 1/2010 | Kilian et al. | |
| 7,670,918 B2 * | 3/2010 | Fukami et al. | 438/382 |
| 7,691,652 B2 | 4/2010 | Van Der Wiel | |
| 7,854,165 B2 | 12/2010 | Ball et al. | |
| 8,033,180 B2 | 10/2011 | Morales et al. | |
| 8,047,072 B2 | 11/2011 | Ball et al. | |
| 2002/0121137 A1 | 9/2002 | Fujiwara et al. | |
| 2003/0183000 A1 | 10/2003 | Yamada et al. | |
| 2004/0261520 A1 | 12/2004 | Lotters | |
| 2005/0022593 A1 | 2/2005 | Franz et al. | |
| 2005/0050953 A1 | 3/2005 | Yamada et al. | |
| 2006/0142634 A1 | 6/2006 | Anstadt et al. | |
| 2006/0260408 A1 | 11/2006 | Villa et al. | |
| 2007/0033990 A1 | 2/2007 | Grey et al. | |
| 2007/0044865 A1 | 3/2007 | Ruesch et al. | |
| 2007/0113644 A1 | 5/2007 | Manaka et al. | |
| 2010/0089146 A1 | 4/2010 | Morita et al. | |
| 2011/0107832 A1 | 5/2011 | Sakuma | |
| 2011/0252882 A1 | 10/2011 | Beck et al. | |

FOREIGN PATENT DOCUMENTS

| | | |
|---|---|---|
| EP | 1992917 | 11/2008 |
| EP | 1992917 A2 | 11/2008 |
| EP | 2040046 | 3/2009 |
| JP | 2007071687 | 3/2007 |
| WO | 2006026633 | 3/2006 |
| WO | 2009019658 | 2/2009 |

OTHER PUBLICATIONS

Search Report for Corresponding Application No. 11162695.8-1234/2378254 Dated Feb. 10, 2012.

Search Report for Corresponding Application No. 12150835.2-2204 Dated May 9, 2012.

U.S. Appl. No. 13/006,397, filed Jan. 13, 2011.

Zhoa et al., "A Thermal Stack Structure for Measurement of Fluid Flow", School of Electrical & Electronic Engineering, Queen's University Belfast BT9 5AH, UK, SPIE vol. 4876, p. 593-604, 2003.

* cited by examiner

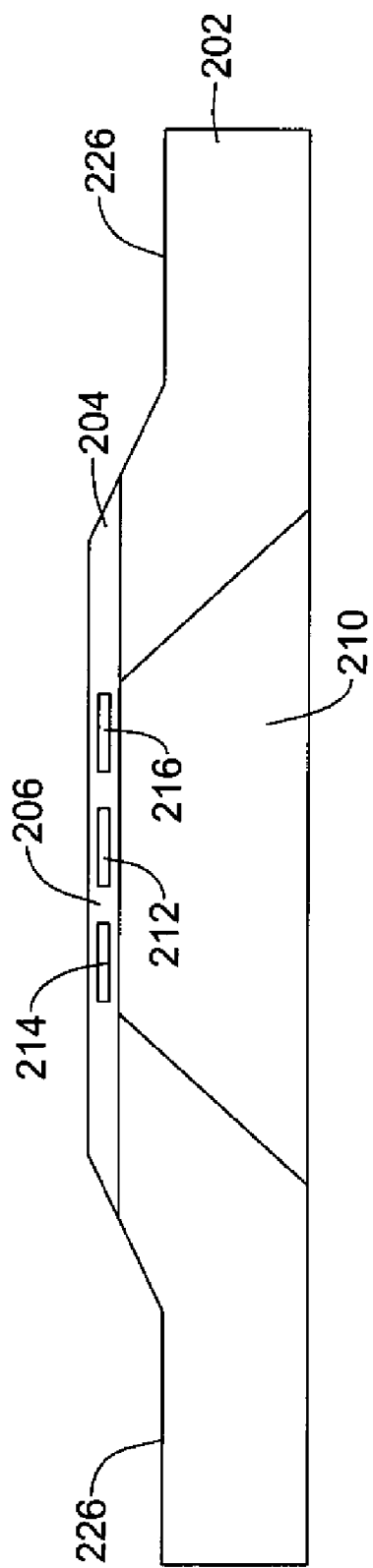

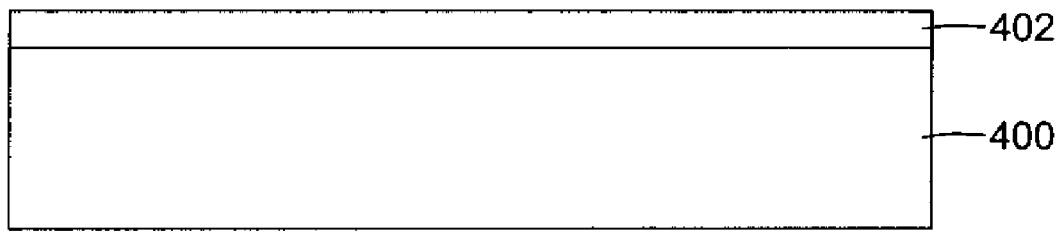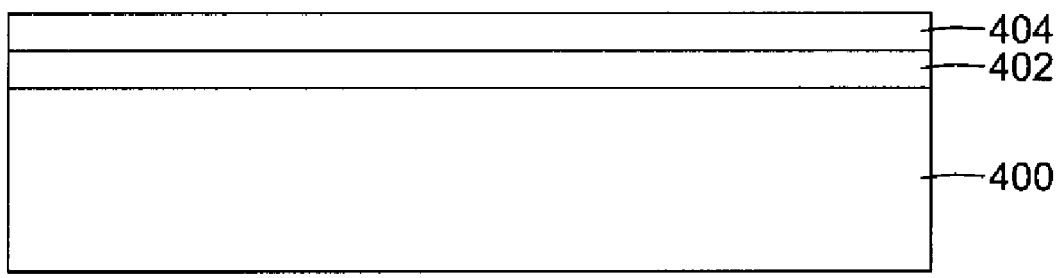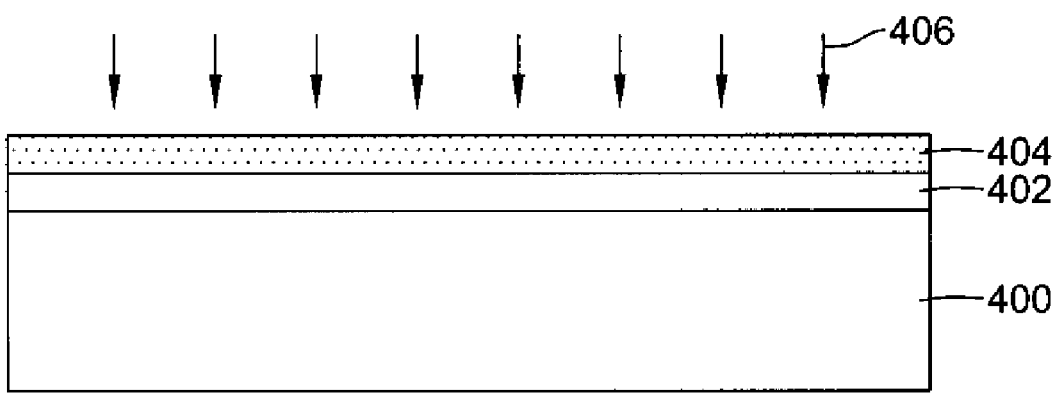
Figure 6A

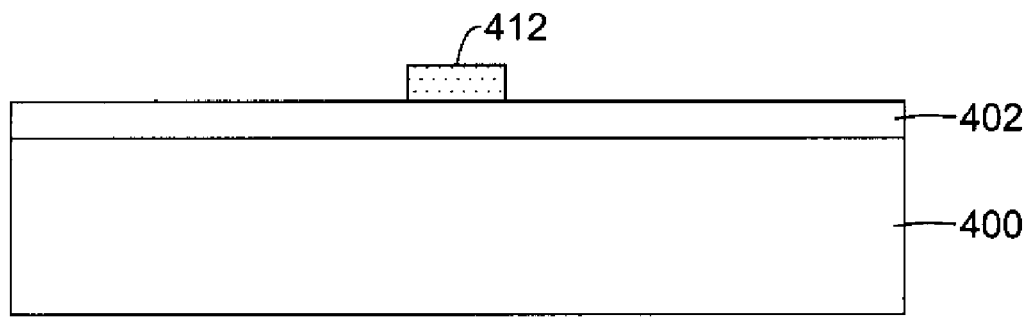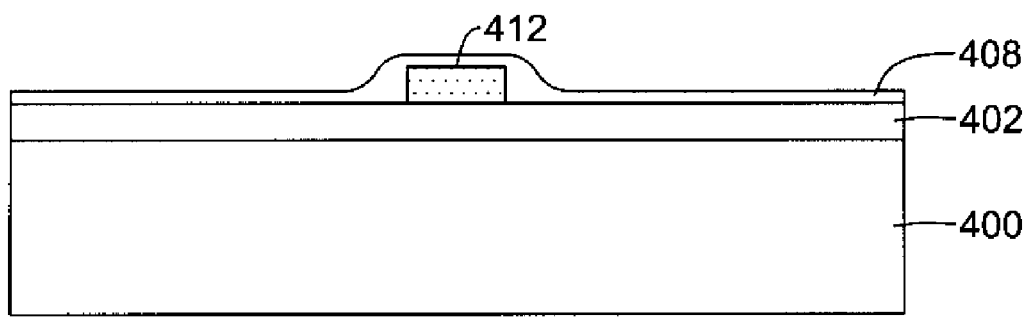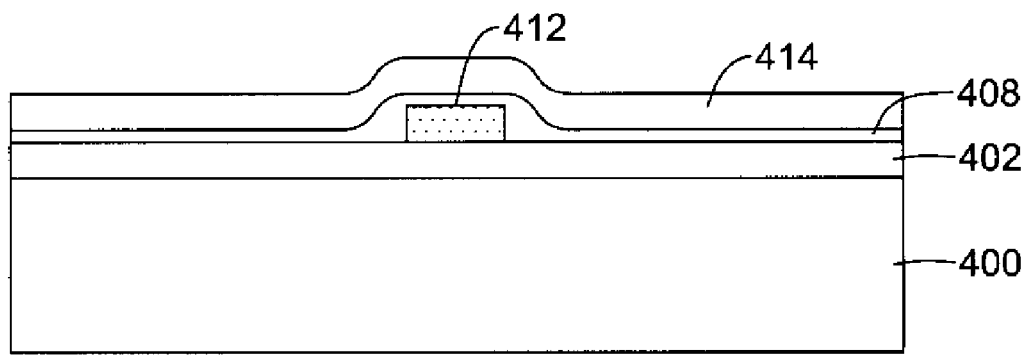
Figure 6B

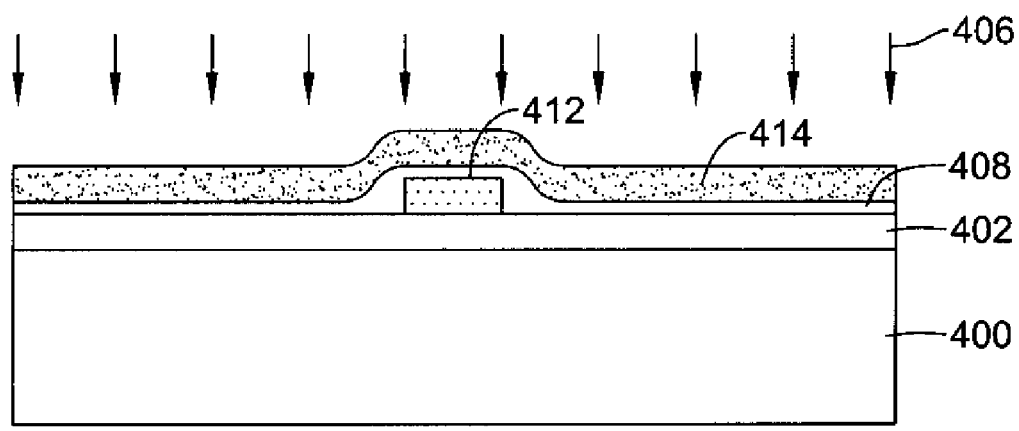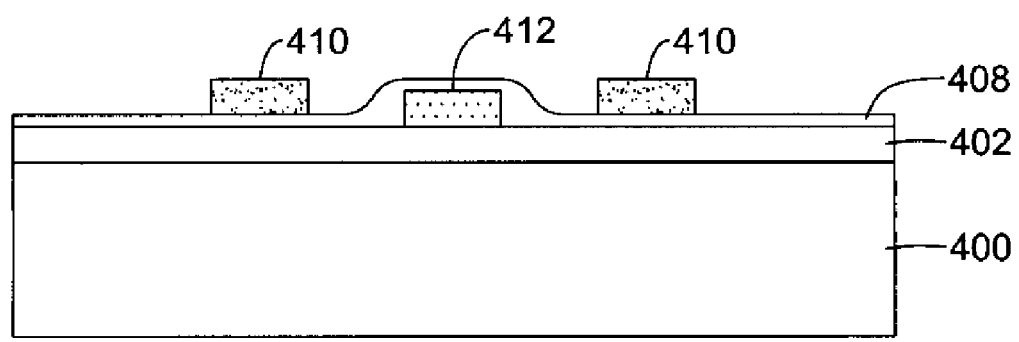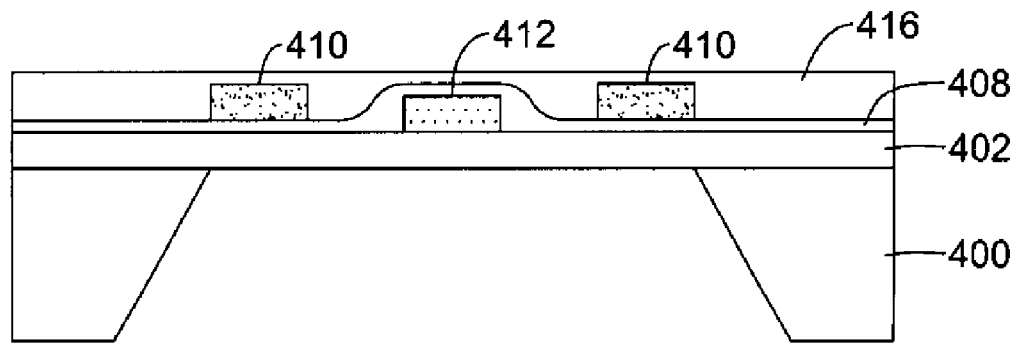
Figure 6C

SENSOR WITH IMPROVED THERMAL STABILITY

FIELD

The present disclosure relates generally to sensors, and more particularly, to sensors that including a heater resistor and/or one or more sensor resistors.

BACKGROUND

Sensors are used in a wide variety of applications. Some sensors include a heater resistor and/or one or more sensor resistors. Such sensors may include some flow sensors, some thermal conductivity sensors, some chemical sensors, and/or other types of sensors. Under some circumstances, such sensors may become thermally unstable, which can affect their accuracy and/or reliability. For example, if a sensor includes a heater resistor that has a positive temperature coefficient of resistance (TCR), and is driven by a constant current source, the heater resistor may heat up, which may then cause the resistance of the heater resistor to further increase, which may cause the heater resistor to heat up further, and so on. This loop may cause damage to the heater resistor and/or the sensor more generally.

SUMMARY

The present disclosure relates generally to sensors, and more particularly, to sensors that including a heater resistor and/or one or more sensor resistors. In one illustrative embodiment, a sensor may include a heater resistor, a first sensing resistor, and a second sensing resistor supported by a substrate. In some cases, the heater resistor may be configured to have a zero or near-zero temperature coefficient of resistance (TCR), which in some cases, may help increase the thermal stability and/or reliability of the sensor. In some instances, the heater resistor may include a polysilicon material that is doped with a first concentration of dopant to achieve the zero or near-zero temperature coefficient of resistance (TCR). The first and/or second sensing resistors may be configured to have a higher temperature coefficient of resistance (TCR) compared to the heater resistor. In some cases, a polysilicon material that has a second higher concentration of dopant and/or a different dopant material may be used for the first and second sensing resistors to achieve the higher temperature coefficient of resistance, but this is not required. Other materials may also be used for the first and second sensing resistors.

The preceding summary is provided to facilitate an understanding of some of the features of the present disclosure, and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which:

FIG. 4 is a schematic cross-sectional view of the illustrative flow sensor die of FIG. 3 taken along line 4-4;

Figure 1:
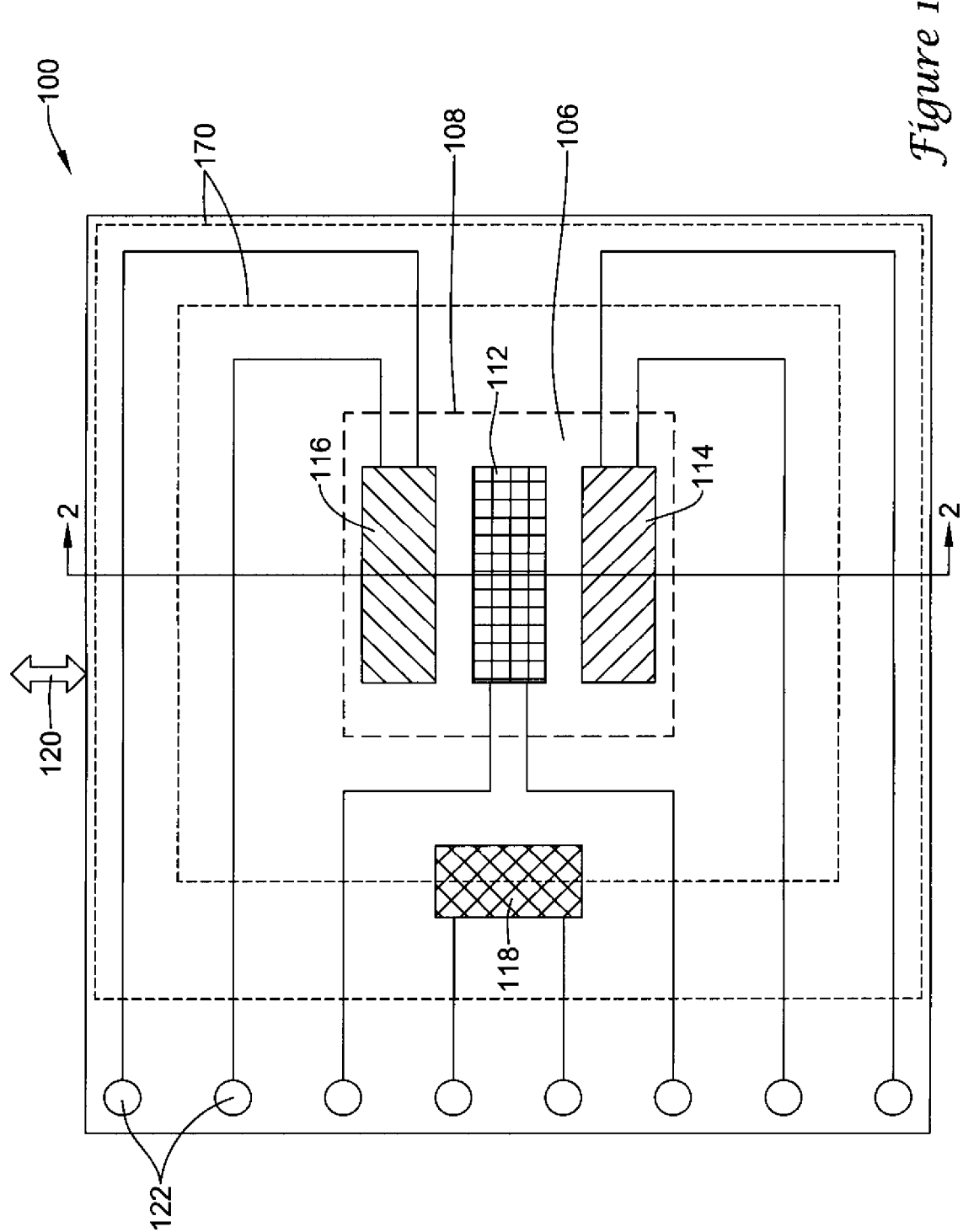
FIG. 1 is a schematic top view of an illustrative flow sensing die.
Figure 5A:
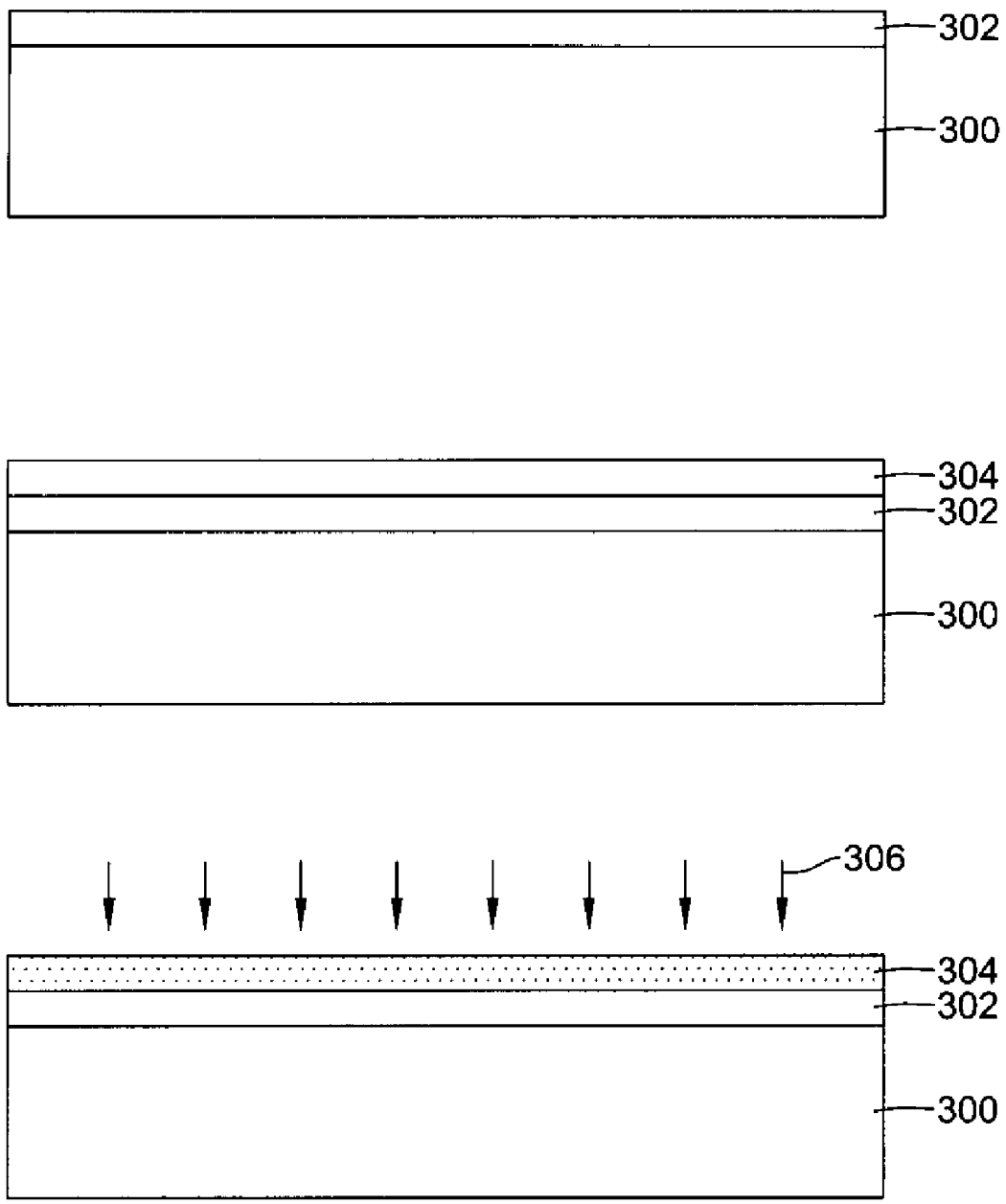
Figure 5B:
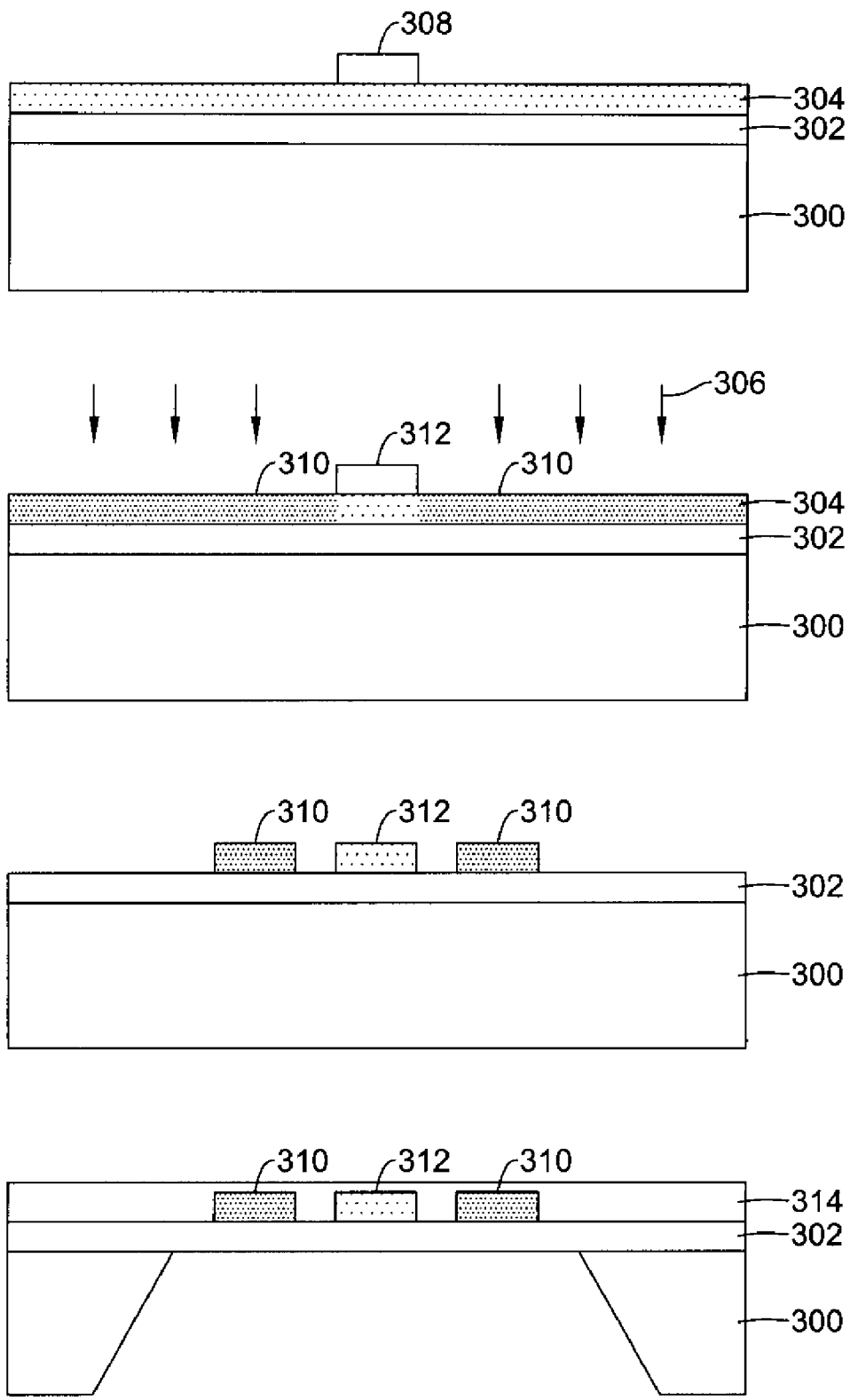

FIG. 5A-B are cross-sectional views showing an illustrative method of fabricating the flow sensing die shown in FIG. 1; and FIGS. 6A-C are cross-sectional views showing another illustrative method of fabricating the flow sensing die shown in FIG. 1.

DESCRIPTION

The following description should be read with reference to the drawings wherein like reference numerals indicate like elements throughout the several views. The description and drawings show several embodiments which are not meant to be illustrative of the present disclosure, and not limiting.

Figure 2:
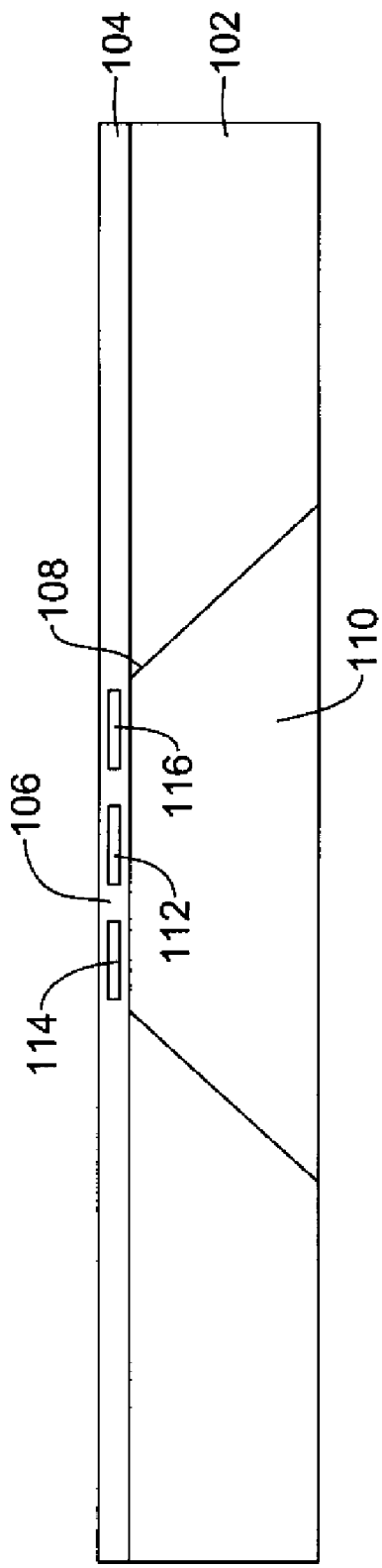
FIG. 2 is a schematic cross-sectional view of the illustrative flow sensing die of FIG. 1 taken along line 2-2.

FIGS. 1 and 2 are schematic top and cross-sectional views of an illustrative embodiment of a flow sensing die 100 for measuring a fluid flow rate of a fluid passing in a flow direction through a fluid channel, which may be provided on a bottom side of the flow sensing die 100 through void 110 or on a top side of the flow sensing die 100. While a flow sensor is used as an example, it is contemplated that the disclosure may be used in any suitable sensor that includes, for example, a heater resistor and/or one or more sensor resistors. Such sensors may include, for example, some flow sensors, some thermal conductivity sensors, some chemical sensors, and/or other types of sensors, as desired. Also, the term "fluid" as used herein can refer to a gas or a liquid, depending on the application. In the illustrative embodiment of FIG. 1, the flow sensing die 100 may be exposed to and/or disposed in a fluid channel to measure one or more properties of a fluid flow. For example, the flow sensing die 100 may be a flow sensor for measuring the mass flow and/or velocity of the fluid flow.

In the illustrative embodiment of FIGS. 1-2, the flow sensing die 100 includes a substrate 102 having one or more thin film layers 104. Thin film layer or layers 104 may be formed from any suitable materials, using any suitable manufacturing technique(s), such as thin film deposition methods. Suitable thin film materials may include silicon, silicon oxide, silicon nitride, silicon oxynitride, and/or any other suitable material or material combinations. In some cases, the thin film layer(s) 104 may form a membrane 106 or diaphragm that is considered part of or supported by substrate 102. As shown, a membrane border 108 may demark the area of thin film layers 104 that form the membrane. The flow sensing die 100 may have a void 110 (see FIG. 2) formed in substrate 102. Void 110 may be formed in any suitable manner, such as, for example, by wet etching the back side of the substrate 102. In some cases, a bottom-most layer of the thin film layer(s) 104 may be an etch-stop layer to aid in wet etching of the substrate 102, but this is not required. For example, an etch-stop layer may be a separate layer such as an oxide or other layer that may help to fabricate the membrane of a well-defined thickness. In some cases, the flow sensing die 100 may begin as a Silicon-On-Insulator (SOI) die, wherein the Insulator layer may form the etch stop layer.

In the illustrative embodiment, the one or more thin film layers 104 may also define one or more heater elements, such as heater resistor 112, and one or more sensor elements, such as sensor resistors 114 and 116. A first sensor resistor 114 can be positioned upstream of the heater resistor 112 and a second sensor resistor 116 can be positioned downstream of the heater resistor 112 relative to the direction of fluid flow 120. However, this is not meant to be limiting and it is contemplated that, in some embodiments, the fluid channel may be a bi-directional fluid channel such that, in some cases, the first sensor resistor 114 is positioned downstream of the heater resistor 112 and the second sensor resistor 116 is positioned upstream of the heater resistor 112. In some instances, only one sensor element may be provided, and in other embodiments, three or more sensor elements may be provided, depending on the application. In some instances, both sensor resistors 114 and 116 may be positioned upstream (or downstream) of the heater resistor 112, if desired.

In some cases, the first sensor resistor 114 and the second sensor resistor 116 may be thermally sensitive resistors that have a relatively large positive or negative temperature coefficient or resistance, such that the resistance varies with temperature. In some cases, the first and second sensing resistors 114 and 116 may be thermistors. In some instances, the first sensor resistor 114, the second sensor resistor 116, and any additional sensor resistors, may be arranged in a Wheatstone bridge configuration, but this is not required.

In the illustrative embodiment, fluid may be directed to flow past flow sensing die 100 in a flow direction denoted by directional arrows 120. In the example shown, when no fluid flow is present and the heater resistor 112 is heated to a temperature higher than the ambient temperature of the fluid in the fluid flow or, in other words, heater resistor 112 may dissipate electrical energy as heat, warming the fluid in its proximity. In this case, a temperature distribution may be created in the fluid and transmitted in a generally symmetrical distribution about the heater resistor 112 to upstream sensor resistor 114 and downstream sensor resistor 116. In this example, upstream sensor resistor 114 and downstream sensor resistor 116 may sense the same or similar temperature (e.g. within 25 percent, 10 percent, 5 percent, 1 percent, 0.001 percent, etc.). In some cases, this may produce the same or similar output voltage in the first sensor resistor 114 and the second sensor resistor 116.

When a fluid flow is present in the fluid channel, and the heater resistor 112 is activated and heated to a temperature higher than the ambient temperature of the fluid in the fluid flow, the symmetrical temperature distribution may be disturbed and the amount of disturbance may be related to the flow rate of the fluid flow in the fluid channel. In this example, the flow rate of the fluid flow may cause the upstream sensor resistor 114 to sense a relatively cooler temperature than the downstream sensor resistor 116. In other words, the flow rate of the fluid flow may cause a temperature differential between the upstream sensor resistor 114 and the downstream sensor resistor 116 that is related to the flow rate of the fluid flow in the fluid channel. In some cases, the temperature differential between the upstream sensor resistor 114 and the downstream sensor resistor 116 may result in an output voltage differential between the upstream sensor resistor 114 and the downstream sensor resistor 116.

In another illustrative embodiment, the mass flow and/or velocity of the fluid flow may be determined by providing a transient elevated temperature condition in the heater resistor 112, which in turn, causes a transient elevated temperature condition (e.g. heat pulse) in the fluid flow. When there is a non-zero flow rate in the fluid flow, the upstream sensor resistor 114 may receive a transient response later than the downstream sensor resistor 116. The flow rate of the fluid flow can then be computed using the time lag between the upstream sensor resistor 114 and downstream sensor resistor 116, or between the time the heater resistor 112 is energized and when the corresponding elevated temperature condition (e.g. heat pulse) is sensed by one of the sensors, such as the downstream sensor resistor 116.

In the illustrative embodiment, performance of the flow sensing die 100 may be dependent on heat transferred to the sensing resistors 114 and 116 through the fluid, and not through other heat conduction paths. In the embodiment shown, membrane 106 may substantially thermally isolate the heater resistor 112 and sensing resistors 114 and 116 from the substrate. Without such thermal isolation, heat may be conducted to/from the flow sensor components from/to the substrate 102, which may reduce the sensitivity and/or performance of the sensing die 100. Material selection may provide an additional or alternative way to thermally isolate the sensing resistors 114 and 116, which may be used in flow sensors with or without thermally-isolating membranes. For example, low thermal conductivity materials that may be used for the substrate 102 may include, for example, fused silica, fused quartz, and/or borosilicate glass. Additionally or alternatively, thermal isolation may be achieved on a substrate with low thermal conductivity thin films such as oxidized porous silicon, aerogels, or any other suitable materials. These are just some examples.

In the illustrative embodiment of FIGS. 1-2, the heater resistor 112 may be configured to have a zero or near-zero temperature coefficient of resistance (TCR), and the sensing resistors 114 and 116 may be configured to have a higher TCR. In some embodiments, the sensing resistors 114 and 116 having the higher TCR may have a TCR value of about 1000 ppm/° C. or greater. In one example, a platinum film, which may be used for the sensing resistors 114 and 116, may have a TCR in the range of about 3000 ppm/° C. to about 3600 ppm/° C. The "near zero" TCR of the heater resistor 112 may be any TCR value less than 1000 ppm/° C. For example, the TCR of the heating resistor 112 may range from zero plus or minus (±) about 1000 ppm/° C., ±about 750 ppm/° C., ±about 500 ppm/° C., ±about 400 ppm/° C., ±about 300 ppm/° C., ±about 250 ppm/° C., ±about 200 ppm/° C., ±about 150 ppm/° C., ±about 100 ppm/° C., ±about 50 ppm/° C. or any other range less than 1000 ppm/° C. (plus or minus).

In one example, the heater resistor 112 and the sensing resistors 114 and 116 may include a polysilicon material that is doped to provide the desired TCR in the heater resistor 112 and the sensing resistors 114 and 116. The polysilicon for the heater resistor 112 and sensing resistors 114 and 116 can be appropriately doped and/or configured to achieve the zero or near-zero TCR and higher TCR, respectively. The TCR of polysilicon may be dependent upon, for example, the polysilicon thickness, the polysilicon grain size, the type of dopant, the dopant concentration, the impurities in the polysilicon (including oxygen incorporation during polysilicon deposition), the thermal annealing process, as well as other factors. In one example, the polysilicon may be doped with any suitable dopant including, for example, phosphorus, arsenic, boron, antimony, gallium, aluminum, and/or other dopants. In some cases, the controlled TCRs for the heater resistor 112 and the sensing resistors 114 and 116 may be achieved by, for example, varying the dopants used and/or the amount of dopants used in each component. It is also contemplated that other thin film resistor materials having the having higher TCR may be used for the sensing resistors 114 and 116 including, for example, platinum, doped crystalline silicon, Permalloy, SiCr, tantalum, tantalum nitride, chromalloy, nichrome, silicide, and/or any other suitable material or material combination.

In some instances, the heater resistor 112 may have a zero or near-zero TCR to increase the thermal stability and/or reliability of the heater resistor 112. For example, when a positive TCR is present in the heater resistor 112, and under certain circumstances (e.g. when the heater resistor 112 is under constant-current biasing), the heater resistor 112 may become thermally unstable. That is, when a constant current is applied, the heater resistor 112 may heat up, which may then cause the resistance of the heater resistor 112 to further increase because of the positive TCR, which may cause the heater resistor to heat up further, and so on. This loop may cause damage to the heater resistor 112 and/or the sensor more generally. Fabricating the heater resistor 112 to have a zero or near-zero TCR helps avoid such a positive feedback loop.

As shown in FIG. 1, the flow sensing die 100 may include one or more wire bond pads 122 situated adjacent or on substrate 102. In some instances, the wire bond pads can be situated along one side of the substrate, as shown in FIG. 1, but this is not required. In some illustrative embodiments, wire bond pads 122 may be disposed along multiple die edges, or at other locations on the sensing die 100, as desired. Wire bond pads 122 may be configured for communicating signals relative to the one or more flow sensing die components, such as heater resistor 112 and sensing resistors 114 and 116, and/or temperature sensor resistor 118. Wire bond pads may include or be formed primarily of gold, aluminum, copper, and/or any other suitable conductor material or material combination, as desired. Traces may be provided to electrically connect the wire bond pads 122 to appropriate flow sensor components. Although not shown, flow sensing die 100 may be combined with a top cap to form a fluid channel for receiving a fluid flow therethrough.

Other flow sensing die configurations are contemplated. For example, the flow sensing die may be configured as a microbridge or a Microbrick™ sensor assembly, but this is not required. Some illustrative methods and sensor configurations that are considered suitable for measuring the mass flow and/or velocity are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensing die 100 may include any of these flow sensor configurations and methods, as desired. It should be recognized, however, that flow sensor 100 may be any suitable flow sensor, as desired. Also, and as indicated above, while flow sensor 100 is used as an example, it is contemplated that the disclosure may be applied to other types of sensors including, for example, thermal conductivity sensors, chemical sensors, and/or other sensors, as desired.

Figure 3:
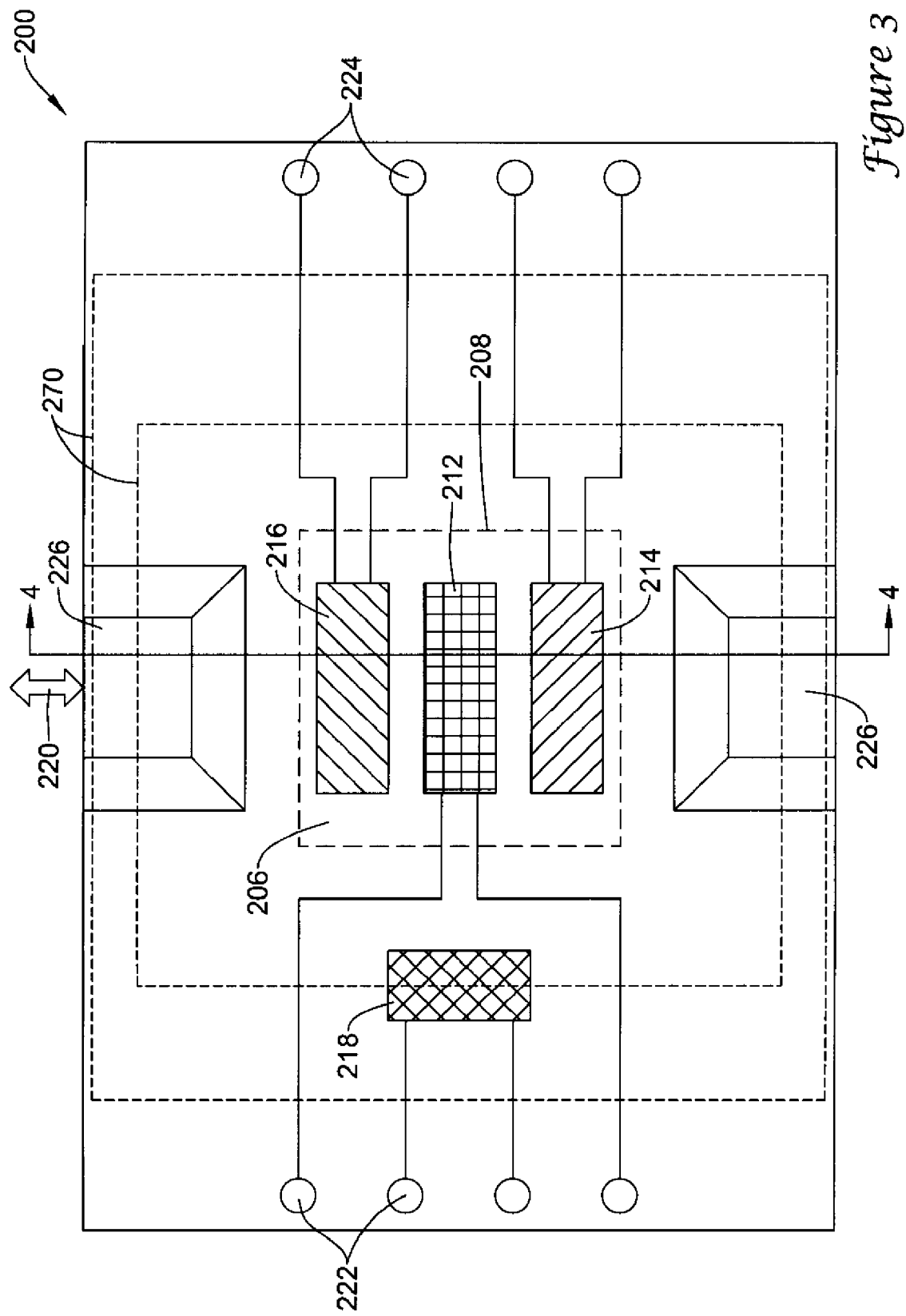
FIG. 3 is a schematic top view of another illustrative flow sensor die.

FIGS. 3 and 4 show a schematic top view and schematic cross-sectional view, respectively, of another illustrative flow sensor die 200. The illustrative flow sensor die 200 shares a number of features with flow sensor die 100. Flow sensor die 200 may include a membrane 206, which may include thin film layers 204 that are part of and/or supported by a substrate 202, with one or more flow sensor components disposed on the membrane, such as a heater resistor 212 and sensing resistors 214 and 216. Flow sensing die 200 may differ from flow sensing die 100 in that wire bond pads can be disposed on both the left 222 and right 224 sides of flow sensing die 200, and/or grooves 226 can be formed in the die 200 to define, at least in part, an inlet and an outlet of a flow channel that extends past at least the flow sensor components.

FIGS. 5A and 5B are cross-sectional views showing an illustrative method of fabricating the flow sensing die 100 shown in FIG. 1. In some embodiments, the flow sensing die 100 may be fabricated as one of a plurality of flow sensing die on a silicon (or other suitable material) wafer.

As shown in FIG. 5A, a silicon wafer, or substrate 300, may be provided with a dielectric layer 302 disposed thereon. The dielectric layer 302 may be formed by, for example, oxidizing the top of the substrate 300. However, other methods of forming the dielectric layer 302 may be used, including deposition. Next, a polysilicon layer 304 (e.g. undoped polysilicon layer) may be deposited on the dielectric layer 302 using suitable fabrication techniques. Then, the undoped polysilicon layer 304 can be lightly doped with a suitable dopant, shown as 306. The dopant may be any suitable dopant including, for example, phosphorus, arsenic, boron, or other dopants. In some cases, the concentration of dopant 306 and/or type of dopant 306 may be selected to achieve a zero or near-zero temperature coefficient of resistance (TCR) in the polysilicon layer 304. These parameters may vary depending upon, for example, the polysilicon thickness, the polysilicon grain size, the impurities in the polysilicon (e.g. oxygen incorporation during polysilicon deposition), and/or the thermal annealing process of the polysilicon.

Then, as shown in FIG. 5B, a capping or masking layer 308 may be providing over a portion of the doped polysilicon layer 304, which will later define the heating resistor 312. Then, the remaining portion of the polysilicon layer 304 may be doped a second time with a dopant 306 to define a heavily doped region. Once the polysilicon has a desired concentration of dopants 306, the capping layer 308 may be removed and the heating resistor 312 and sensing resistors 310 may be defined using suitable fabrication techniques (e.g. photolithography).

In some embodiments, after the lightly doped heating resistor 312 and heavily doped sensing resistors 310 have been defined, a thin film protective layer 314 such as, for example, silicon nitride may be deposited over the heating resistor 312 and sensing resistors 310. Also, it is contemplated that the substrate 300 may be back-sided etched to define void (e.g. void 110 of FIG. 2) using any suitable etching technique, such as, for example, wet etching with anisotropic etchants (e.g., KOH, TMAH, or EDP) or dry, deep reactive ion etching.

FIGS. 6A-6C are cross-sectional views showing another illustrative method of fabricating the flow sensing die 100 shown in FIG. 1. In some embodiments, the flow sensing die 100 may be fabricated as one of a plurality of flow sensing die on a silicon (or other wafer). As shown in FIG. 6A, a silicon wafer, or substrate 400, may be provided with a dielectric layer 402 formed thereon. The dielectric layer may be formed by, for example, oxidizing the substrate 400. However, other methods of forming the dielectric layer 402 may be used. Next, a polysilicon layer 404 (e.g. undoped polysilicon layer) may be deposited on the dielectric layer 402 using suitable fabrication techniques. Then, the undoped polysilicon layer 404 can be lightly doped with a suitable dopant 406. The dopant 406 may be any suitable dopant including, for example, phosphorus, arsenic, boron, or other dopant(s). In some cases, the concentration of dopant 406 and/or type of dopant 406 may be selected to achieve a zero or near-zero temperature coefficient of resistance in the polysilicon layer 404. These parameters may vary depending upon, for example, the polysilicon thickness, the polysilicon grain size, the impurities in the polysilicon (e.g. oxygen incorporation during polysilicon deposition), and/or the thermal annealing process.

Then, as shown in FIG. 6B, the heating resistor 412 may be defined in the polysilicon layer 404 using suitable fabrication techniques. Then, a thin film protective layer 408 such as silicon nitride, may be deposited over the heating resistor 412. A second undoped polysilicon layer 414 may be deposited using suitable deposition techniques. Then, as shown in FIG. 6C, the second undoped polysilicon layer 414 can be heavily doped with a suitable dopant 406. The dopant may be any suitable dopant including, for example, phosphorus, arsenic, boron, or other suitable dopant(s). In some cases, the concentration of dopant 406 and/or type of dopant 406 may be selected to achieve a relatively high temperature coefficient of resistance in the polysilicon layer 414. These parameters may vary depending upon, for example, the polysilicon thickness, the polysilicon grain size, the impurities in the polysilicon (in particular oxygen incorporation during polysilicon deposition), and/or the thermal annealing process of the polysilicon. The sensing resistors 410 may then be defined using suitable fabrication techniques.

In some embodiments, after the lightly doped heating resistor 412 and heavier doped sensing resistors 410 have been defined, a thin film protective layer 416 such as silicon nitride, may be deposited over the heating resistor 412 and sensing resistors 410. In some cases, the substrate 400 may be backsided etched to define a void (e.g. void 110 of FIG. 2) using any suitable etching technique, such as, for example, wet etching with anisotropic etchants (e.g., KOH, TMAH, or EDP) or dry, deep reactive ion etching.

The foregoing methods of fabricating the flow sensing die 100 are merely illustrative, and it is contemplated that other methods may be used to provide a sensing die having a heating resistor with zero or near-zero TCR and sensing resistors with higher TCRs. For example, instead of depositing a second undoped polysilicon layer 414 and then heavily doping layer 414 with a dopant, it is contemplated that a material other than polysilicon may be deposited and then doped, or a material having a higher TCR may be deposited. The sensing resistors may then be defined in this material layer using suitable fabrication techniques. Example materials may include platinum, Permalloy, doped crystalline silicon, SiCr, tantalum, tantalum nitride, chromalloy, nichrome, silicide, and/or any other suitable material or material combination.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensing die for sensing a flow of fluid along a flow direction, the flow sensing die comprising:
 a substrate, the substrate defining a membrane;
 a heater resistor supported by the membrane, wherein the heater resistor includes a polysilicon material that is doped with a first concentration of a dopant;
 a first sensing resistor supported by the membrane at a position upstream of the heater resistor relative to the flow direction;
 a second sensing resistor supported by the membrane at a position downstream of the heater resistor relative to the flow direction; and
 wherein the first sensing resistor and the second sensing resistor include a polysilicon material that is doped with a second concentration of a dopant, wherein the second concentration is greater than the first concentration.

2. The flow sensing die of claim 1, wherein the first concentration of dopant is configured to provide the heater resistor with a temperature coefficient of resistance (TCR) in the range of zero plus or minus about 500 ppm/° C.

3. The flow sensing die of claim 1, wherein the second concentration of dopant is configured to provide a larger temperature coefficient of resistance in the first sensing resistor and the second sensing resistor relative to the heater resistor.

4. The flow sensing die of claim 1, wherein the dopant includes phosphorus, arsenic, boron, antimony, aluminum, or gallium.

5. The flow sensing die of claim 1, wherein, when the heater resistor is activated, the first sensing resistor and the second sensing resistor are configured to sense a temperature differential in the flow of fluid along the flow direction.

6. The flow sensing die of claim 1, wherein the heater resistor, the first sensing resistor, and the second sensing resistor are thin film resistive elements.

7. A sensor comprising:
 a substrate;
 a heater resistor supported by the substrate, wherein the heater resistor includes a polysilicon material that is doped to provide a zero or near-zero temperature coefficient of resistance (TCR); and
 one or more sensing resistors supported by the substrate, wherein the one or more sensor resistors include a material having a larger temperature coefficient of resistance (TCR) compared to the heater resistor.

8. The sensor of claim 7, wherein near-zero is in the range of plus or minus 500 ppm/° C.

9. The sensor of claim 7, wherein the heater resistor includes a polysilicon material that is doped with a first concentration of a dopant.

10. The sensor of claim 9, wherein the one or more sensing resistors include a polysilicon material that is doped with a second concentration of dopant, wherein the second concentration of dopant is higher than the first concentration of dopant.

11. The sensor of claim 10, wherein the dopant includes phosphorus, arsenic, boron, antimony, aluminum, or gallium.

12. The sensor of claim 7, wherein the one or more sensing resistors includes a non-doped material having the larger TCR.

13. The sensor of claim 12, wherein the non-doped material includes platinum or Permalloy.

14. The sensor of claim 7, wherein the heater resistor and the one or more sensing resistors are thin film resistive elements.

* * * * *